US007808132B2

United States Patent
Knorr et al.

(10) Patent No.: US 7,808,132 B2
(45) Date of Patent: Oct. 5, 2010

(54) ELECTRIC MACHINE COMPRISING A SCREENED LEAKAGE-FIELD-SENSITIVE SENSOR

(75) Inventors: Markus Knorr, Augsburg (DE); Georg Schlatterer, Zahling (DE); Dominik Schury, München (DE)

(73) Assignee: Siemens Aktiengesellschaft, München (DE)

( * ) Notice: Subject to any disclaimer, the term of this patent is extended or adjusted under 35 U.S.C. 154(b) by 1 day.

(21) Appl. No.: 12/281,818

(22) PCT Filed: Feb. 1, 2007

(86) PCT No.: PCT/EP2007/050981

§ 371 (c)(1),
(2), (4) Date: Sep. 5, 2008

(87) PCT Pub. No.: WO2007/101760

PCT Pub. Date: Sep. 13, 2007

(65) Prior Publication Data

US 2009/0026849 A1    Jan. 29, 2009

(30) Foreign Application Priority Data

Mar. 6, 2006 (DE) .................. 10 2006 010 197

(51) Int. Cl.
*H02K 41/02* (2006.01)
*H02K 41/03* (2006.01)

(52) U.S. Cl. .............. 310/12.01; 310/12.02; 310/12.04; 310/12.14; 318/135

(58) Field of Classification Search .................. 310/12, 310/12.01–12.14; 318/135
See application file for complete search history.

(56) References Cited

U.S. PATENT DOCUMENTS

| 5,023,495 A | 6/1991 | Ohsaka |
| 6,008,552 A | 12/1999 | Yagoto et al. |
| 6,400,046 B1 * | 6/2002 | Hwang et al. ............ 310/12.19 |

FOREIGN PATENT DOCUMENTS

| DE | 100 04 774 A1 | 11/2000 |
| DE | 100 39 916 A1 | 2/2002 |
| DE | 103 29 150 A1 | 1/2005 |
| JP | 7123524 A | 5/1995 |
| JP | 10201216 A | 7/1998 |
| JP | 2002354779 A | 12/2002 |

* cited by examiner

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The aim of the invention is to improve the precision of measuring leakage field sensitive sensors on electric machines. According to the invention, the electric machine comprises a sensor device (4) which is sensitive to magnetic leakage fields mounted on one of the two active parts (1) or in a defined relative position in relation to the active parts. A magnetic screening device is arranged between the sensor device (4) and one of the two active parts (1). Also, the magnetic leakage fields no longer have an influence on the sensor device such that measuring precision is increased.

7 Claims, 1 Drawing Sheet

ELECTRIC MACHINE COMPRISING A SCREENED LEAKAGE-FIELD-SENSITIVE SENSOR

BACKGROUND OF INVENTION

Figure 1:
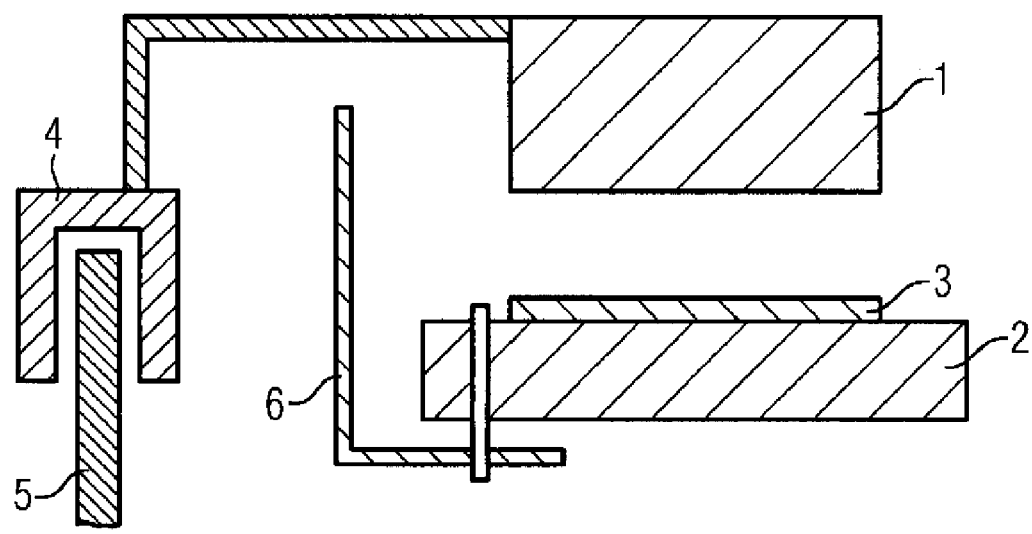

The present invention relates to an electric machine comprising a first active part, a second active part which interacts with the first active part, and a sensor device for determining a kinematic quantity between the first and the second active part.

As a rule, operating a synchronous servomotor as inverter requires a position signal for determining the instantaneous commutation angle and/or for position control. This signal is usually obtained by an external position measuring system which is independent of the active parts of the motor. For this purpose, magnetic material measures with corresponding magnetic sensing principles are used more and more frequently instead of optical ones for cost reasons and because of their robustness against soiling. For speed acquisition, tachogenerators can be used in principle, but they only play a subordinate role particularly in the case of direct drives. For the acquisition of relative acceleration, in contrast, Ferraris sensors measuring on the basis of the eddy current principle are very suitable, the material measure of which consists of a non-magnetic metal strip, mostly of aluminum.

The said sensors are more or less sensitive to magnetic leakage fields which, however, are inevitably radiated by the electric machines. Particularly in the case of direct drives (linear and torque motors), measuring errors or even the destruction of the sensor occur if the leakage-field-sensitive sensors are correspondingly close to the active parts of the motor.

With regard to these problems, it has therefore been pointed out hitherto in the case of the magnetic position measuring systems that a certain distance from strong magnets must be kept.

However, this is opposed to a construction which is as compact as possible and to an integration of such a sensor directly in or at the motor components which is frequently advantageous also for control related reasons.

SUMMARY OF THE INVENTION

It is thus the object of the present invention to reduce the frequency of measuring errors in the case of kinematic quantities in the case of an electric machine comprising leakage-field-sensitive sensors.

According to the invention, this object is achieved by an electric machine comprising a first active part, a second active part which interacts with the first active part, and a sensor device for determining a kinematic quantity between the first and the second active part, the sensor device being sensitive to a magnetic leakage field, the sensor device being mounted on one of the two active parts or in a particular geometric relative position to the active parts on a machine component and a magnetic screening device being arranged between the sensor device, on the one hand, and one or both active parts, on the other hand.

Due to the screening according to the invention it is advantageously possible to integrate magnetically leakage-field-sensitive sensors, for example, in a synchronous servomotor in order to acquire kinematic quantities such as, for example, the acceleration, the speed or the position for controlling these quantities or, respectively, for determining the pole position or the commutation angle in the case of inverter operation.

The electric machine is advantageously designed as a linear motor, the two active parts representing the primary part and secondary part. In this case, for example, the linear position of the primary part can be determined with reduced frequency of measuring errors.

However, the electric machine according to the invention can also be designed as a torque motor, the two active parts representing the rotor and the stator. In this case, kinematic rotation quantities of the rotor can be acquired better because of the screening of leakage-field-sensitive sensors.

The magnetic screening device preferably essentially consists of a magnetically conductive sheet metal. Such a sheet metal can be shaped almost arbitrarily so that only very little constructional space is needed.

In accordance with a preferred embodiment, the sensor device is mounted on one active part and a material measure which can be sensed by the sensor device is mounted on the other active part. This makes it possible to carry out a very precise acquisition of the relative position of the two active parts with respect to one another.

The magnetic screening device can be a housing of the sensor device which can be mounted on the corresponding active part. The screening device thus has multiple functionality because it is used not only for screening but also as protection against soiling etc.

A further preferred embodiment of the present invention consists in that the magnetic screening device is mounted directly on the sensor device. As a result, in the case of a linear motor, not the entire secondary part needs to be screened but it is sufficient if the sensor device itself is screened.

In certain cases, it may be advantageous if an electric screening device is arranged between the magnetic screening device and one of the two active parts. This is advantageous if eddy currents which influence the sensor were to arise in the magnetic screening device.

BREIF DESCRIPTION OF THE DRAWING

Figure 2:
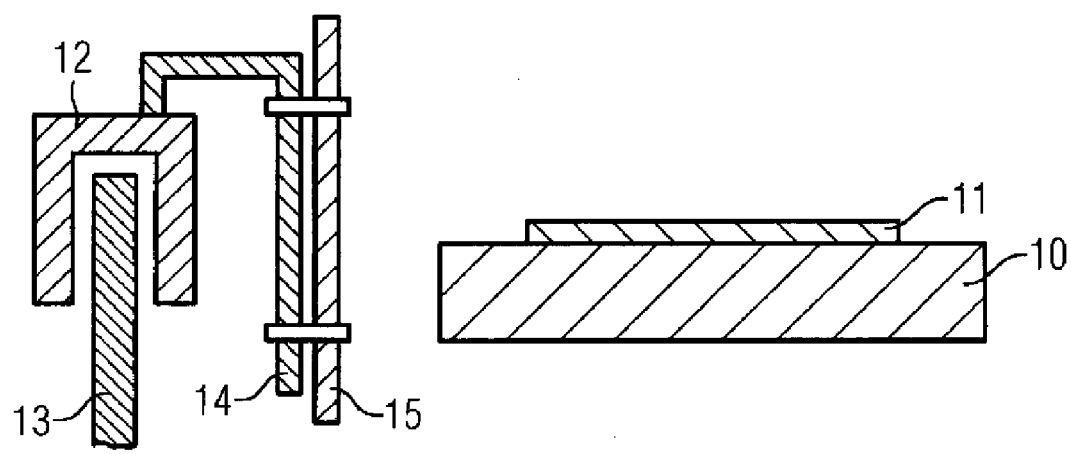

The present invention will now be explained in greater detail with reference to the attached drawings, in which:

FIG. 1 shows a cross section through a linear motor according to a first embodiment of the present invention, and FIG. 2 shows a cross section through a linear motor according to a second embodiment of the present invention.

DETAILED DESCRIPTION OF PREFERRED EMBODIMENTS

The exemplary embodiments described in greater detail in the text which follows represent preferred embodiments of the present invention. FIG. 1 shows the basic structure of a linear motor according to the invention in cross section. A primary part 1 can be moved over a secondary part which is equipped with permanent magnets. On the primary part 1, a sensor 4 is mounted. This senses a material measure 5 which extends along the secondary part 2 in parallel with it.

Both the secondary part 1 and the permanent magnets 3 of the secondary part 2 in each case generate an electric leakage field which also influences the sensor 4. However, a screening plate 6 is now arranged between the primary part 1 and the sensor 4 but also between the secondary part 2 and the sensor 4 for screening these leakage fields. In the present example, this screening plate 6 is mounted on a secondary part 2.

In the case where the primary part is also occupied with the permanent magnets, it is sufficient to place the screening plate between the primary part 1 and the sensor 4 since the secondary part 2 does not produce a magnetic leakage field in this case.

In FIG. 1, only one sensor 4 is indicated. However, several leakage-sensitive-sensors for kinematic quantities can also be mounted on the primary part, for example a Ferraris sensor for acceleration measurement next to a magnetic position sensor. A further alternative consists in that the sensor or sensors is or are arranged at the secondary part and the material measure 5 is arranged at the primary part. It is only essential that the screening plate 6 keeps leakage fields away from the primary and/or secondary part.

The magnetically conductive material located in the area between the magnets and the leakage-field-sensitive sensor should have a very high relative permeability, e.g. $\mu r$ approximately =100,000. In comparison, transformer sheet in direct drives has approximately a relative permeability of $\mu r$~5,000 to 10,000. This screening makes it possible to create a magnetically uncritical space for the sensor 4.

According to the exemplary embodiment of FIG. 1, screening is performed by a simple strip 6. Depending on the actual situation, however, the screening can also assume a different shape. For example, a housing around the sensor and the material measure having simultaneous mounting function can also be selected for the screening.

In another embodiment, the magnetic screening part can also be mounted on the leakage-field-sensitive sensor head itself as is shown in FIG. 2. The representation of the primary part has been omitted in FIG. 2. With regard to the leakage-field generation, only the secondary part 10 with magnets 11 is shown. A sensor 12 which is joined to the primary part, not shown, moves relative to a material measure 13. A screening plate 14 is mounted directly on the sensor head or sensor 12, respectively. However, this means that a relative speed is produced between the magnetic screening material and the magnetic leakage field. As a result, eddy currents occur in the magnetic screening material 14 at speeds not equal to zero which, in turn, can cause leakage fields on the leakage-sensitive sensor 12. To minimize these influences, an electrically conductive screening material must therefore be inserted between the secondary part 10 and the magnetic screening plate 14. In the present case, an electrically conductive screening plate 15 which is mounted on the magnetic screening plate 14 is provided for this purposes. As the electric screening material, copper is used, for example. In this manner, the eddy current effects on the sensor 12 can be effectively damped.

The magnetic screening plate 6 or 14, respectively, advantageously provides protection during assembly against accidental contact of the magnetically sensitive sensor 4, 12 with permanent magnetic direct drive parts. A further advantage of the screening plate 6, 14 lies in the fact that it can be used as support material, for mounting purposes and as housing for the material measure or the sensor or both. In any case, it is possible to achieve an increase in the measuring precision overall in comparison with a sensor device which is not protected against magnetic leakage fields.

What is claimed is:

1. An electric machine, comprising:
a first active part;
a second active part interacting with the first active part;
a sensor device for determining a kinematic quantity between the first and the second active part, said sensor device constructed to be sensitive to a magnetic leakage field and mounted on one of the first and second active parts or on a machine component in a geometric predefined relative position with respect to the first and second active parts;
a magnetic screening device arranged between the sensor device and at least one of the first and second active parts; and
an electric screening device arranged between the magnetic screening device and one of the first and second active parts to damp eddy current effects on the sensor device.

2. The electric machine of claim 1, constructed as linear motor, with the first and second active parts representing a primary part and a secondary part, respectively.

3. The electric machine of claim 1, constructed as torque motor, with the first and second active parts representing a rotor and a stator, respectively.

4. The electric machine of claim 1, wherein the magnetic screening device is essentially made of a magnetically conductive sheet metal.

5. The electric machine of claim 1, wherein the sensor device is mounted on one of the first and second active parts, and further comprising a material measure sensed by the sensor device and mounted directly or indirectly on the other one of the first and second active parts.

6. The electric machine of claim 1, wherein the sensor device has a housing to form the magnetic screening device, said housing being mounted on the one of the first and second active parts.

7. The electric machine of claim 1, wherein the magnetic screening device is mounted directly on the sensor device.

* * * * *